CIRCUITRY FOR INDEPENDENTLY DELAYING THE LEADING AND TRAILING EDGES OF AN INPUT PULSE

Filed March 23, 1959

INVENTOR.
JOHN H. GUENTHER
BY Francis E. Blake
ATTORNEY 3,007,060

CIRCUITRY FOR INDEPENDENTLY DELAYING THE LEADING AND TRAILING EDGES OF AN INPUT PULSE

John H. Guenther, Rochester, N.Y., assignor to General Dynamics Corporation, Rochester, N.Y., a corporation of Delaware Filed Mar. 23, 1959, Ser. No. 801,156
3 Claims. (Cl. 307—88.5)

Figure 1:
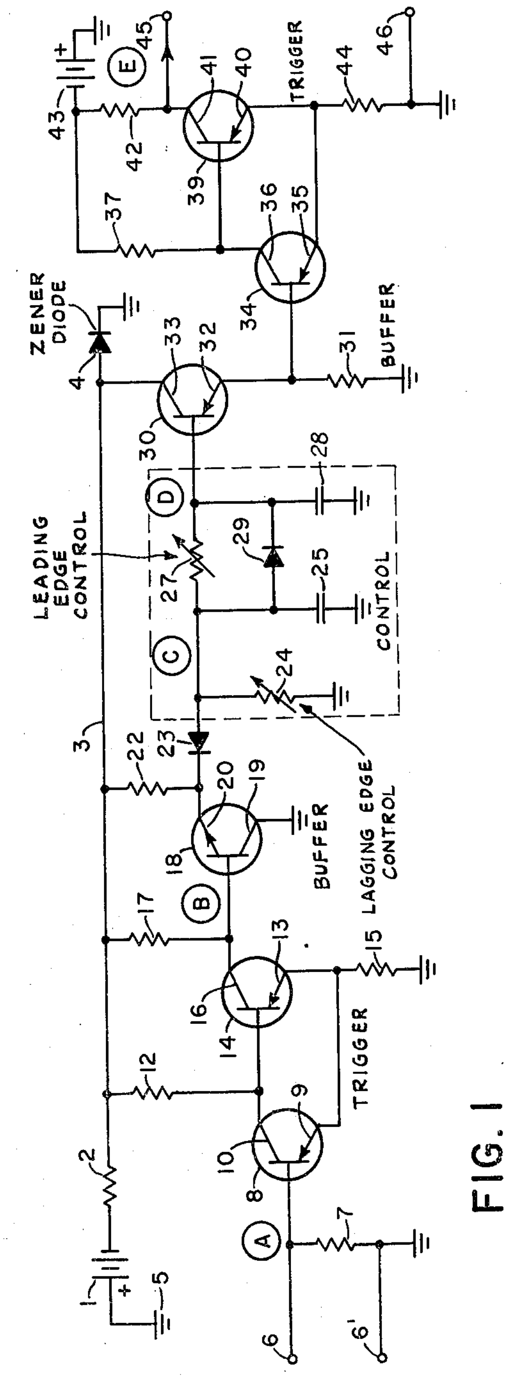

The present invention relates to circuits for delaying and/or shaping voltage pulses.

Telephone systems utilizing audio frequencies for signaling purposes may employ voice guard gates to prevent certain audio frequencies present in voice signals from actuating supervisory or switching equipment. Accurate and stable time delay circuits are needed in these guard gates to delay pulses of incoming signals for a fixed time interval and yet have a rapid recovery time and high frequency response. The need for an accurate, rapidly recovering and temperature stable pulse delay and shaping circuit in electronic computers, testing equipment or practically any other type of electronic device is also obvious.

It is an object of the present invention to provide a novel and improved pulse delay and shaping circuit.

Another important object of this invention is to provide a pulse delay and shaping circuit that will enable an output pulse to be delayed with respect to an input pulse by a variable amount such that the leading edge and trailing edge of the output pulse may be independently delayed relative to the leading edge and trailing edge of the input pulse.

Another object of the present invention is to provide a novel and improved circuit for changing the width of delayed pulses if desired.

Yet another object of the invention is to provide a pulse delay and shaping circuit having rapid recovery time and high frequency of response to rapidly recurring pulses.

Still another object of the invention is to provide an improved pulse delay and shaping circuit to produce output pulses whose leading and trailing edges may be variably delayed with respect to the leading and trailing edges of input pulses, and which is stabilized to maintain a preset condition of delay over wide ranges of temperature and for high frequencies of response.

A feature of the invention is the provision of a pulse delaying and shaping circuit employing a first trigger circuit to produce a uniform amplitude voltage pulse for the duration of an input pulse which may be of variable amplitude, the output of which is coupled to a novel form of trigger control circuit for connection to a second trigger circuit, which produces an output pulse whose leading edge is delayed relative to the leading edge of the input pulse in accordance with the rates of increase of the amplitude of a second trigger control voltage developed in the trigger control circuit during the duration of the input pulse, and whose trailing edge is delayed in accordance with the rates of decay of the amplitude of the afore-mentioned control voltage after the cessation of the input pulse.

Another feature of the invention according to the afore-mentioned features is the specific provision in the trigger control circuit of means to separately predetermine the rates of increase of the amplitude of the second trigger control voltage developed in the trigger control circuit, and to separately predetermine the rates of decay of the second trigger control voltage produced by the control circuit after cessation of the input pulse coupled thereto by the first-mentioned trigger circuit.

A further feature of the invention is the provision of an isolation stage between the control circuit and the afore-mentioned second trigger circuit to prevent the discharge of an integrating capacitor in the control circuit through the low impedance input circuit of the second trigger circuit while the integrating capacitor is charging, so that changes in the afore-mentioned input impedance of the second trigger circuit with changes in temperature, cannot affect the charging rate of said capacitor over varying conditions of ambient temperature to thereby vary in turn the delay time of the leading and trailing edges of the input pulse.

A further feature of the invention is the provision of an isolation stage between the first trigger circuit and the control circuit, to prevent changes in the input impedance of the control circuit from affecting the output voltage of the first trigger circuit to thereby affect the rate of charging of the integrating capacitor to vary in turn the delay time of the leading and trailing edges of the input pulse.

Yet another feature of the present invention is the provision of a source of regulated voltage for preventing voltage fluctuations from affecting the delay intervals of the leading and trailing edges of an input pulse.

Further objects, features and the attending advantages of the invention will become apparent with reference to the following specification and drawing in which:

FIGURE 1 discloses a preferred embodiment of applicant's invention; and

Figure 2:
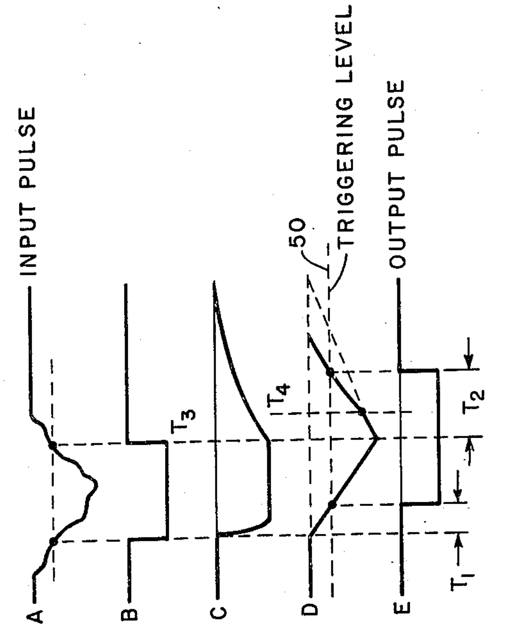

FIGURE 2 shows the waveforms of signals present at various points in the circuit of FIGURE 1.

According to the invention, an input trigger circuit is coupled to a control circuit which in turn is coupled to an output trigger circuit. The primary function of this input trigger circuit is to limit the input pulse to produce a uniform rectangular pulse so that the pulse delay intervals are independent of the amplitude of the input pulse. A secondary function of this trigger circuit is to amplify low amplitude input signals providing they have a sufficient amplitude to trigger the input trigger circuit. Noise signals are generally of an insufficient amplitude to cause this triggering, and thus will be ignored by the circuit of this invention. The control circuit which is responsive to the afore-mentioned rectangular pulse, produces a control voltage which controls the time in which the output trigger circuit changes from one state to another to thereby form the output pulse. The uniform rectangular pulse produced by the first trigger circuit commences to charge an RC timing circuit which includes an output trigger control capacitor. The voltage developed across this capacitor controls the state of the output trigger circuit. The trigger control capacitor is large enough so that it continues charging for the duration of the rectangular pulse. Soon after this pulse is applied to the RC circuit, the voltage developed across the trigger control capacitor reaches a sufficient amplitude to change the state of the output trigger circuit to produce the leading edge of an output pulse. After the input pulse ceases, the above-mentioned trigger control capacitor begins to discharge very slowly through a high resistance path. A threshold capacitor which becomes charged up by the rectangular pulse almost immediately, in contrast with the trigger control capacitor, begins to discharge much more rapidly than the trigger control capacitor, and a normally blocked diode bridging the two capacitors becomes unblocked and allows the trigger control capacitor to discharge more rapidly than before since a lower resistance discharge path is now made available to this capacitor through the diode. The amplitude of the control voltage developed across the trigger control capacitor now declines rapidly and the output trigger circuit is again triggered back into its original state to produce the trailing edge of the output pulse.

For a detailed understanding of the circuit of the invention, reference is made to FIGURE 1. A regulated source of direct current is provided for the various transistors excluding transistors 34 and 39. This regulated source comprises the source of direct current voltage such as battery 1 whose negative terminal is connected in series with resistor 2 and the Zener diode 4 to ground and the terminal at 5. The current flow through resistor 2 and Zener diode 4 will produce a voltage on lead 3 which is regulated. As is well known, although the direct current source 1 might produce a fluctuating voltage, this fluctuation will not be present on lead 3 because the voltage drop across Zener diode 4 operated at the Zener point will be constant at all times.

Transistors 8 and 14 comprise an input trigger circuit which is preferably of the so-called Schmidt type. The input pulse to be delayed is applied across input terminals 6 and 6'. Input terminal 6 is connected to ground through input load resistor 7 and to the base of PNP transistor 8. Input terminal 6' is connected directly to ground. The emitter of transistor 8 is connected to ground through resistor 15. The collector of transistor 8 is connected to lead 3, which carries the regulated D.C. voltage necessary to operate the circuit, through load resistor 12. This collector is also connected to the base of PNP transistor 14. The emitter 13 of transistor 14 is connected to ground through resistor 15 and the collector 16 of transistor 14 is connected to lead 3 through load resistor 17. This collector is directly coupled to the base of transistor 18 which comprises an isolating stage to isolate the output of the Schmidt trigger circuit from the input to the control circuit. Collector 19 of NPN transistor 18 is connected directly to ground, and emitter 20 is connected to resistor 22 which is connected in turn to lead 3. This emitter is coupled to the control circuit through diode 23.

Applicant's novel control circuit comprises resistor 24 which is connected between the anode of diode 23 and ground, and threshold capacitor 25 which is connected in parallel with resistor 24. A series RC circuit comprising resistor 27 and trigger control capacitor 28 is connected in parallel with threshold capacitor 25. Diode 29 is connected in parallel with resistor 27. The output of the timing and integrating circuit is shown at point D in FIGURE 1 and is directly connected to the base of PNP transistor 30 which together with resistor 31 forms an isolation emitter follower. The collector 33 of transistor 30 is connected to lead 3 and emitter 32 of transistor 30 is connected to ground through resistor 31 and is also connected to the base of transistor 34. Transistor 34 and transistor 39 together with resistors 37, 42 and 44 form the output trigger circuit for producing the delayed pulse. Emitter 35 of transistor 34 and emitter 40 of transistor 39 are both connected to ground through resistor 44. Collector 36 is connected to the base of transistor 39 and is also connected through resistor 37 to a negative terminal of voltage source 43 whose positive terminal is grounded. Collector 41 of transistor 39 is connected to output terminal 45 and is also connected to a negative terminal of voltage source 43 through resistor 42. Output terminal 46 is connected to ground.

The operation of the pulse shaping and delay circuit is as follows: An input pulse to be delayed is applied across input terminals 6 and 6' as shown in FIGURE 1. This pulse, in order to be shaped and delayed by the circuit of the present invention, may have any waveform providing its amplitude exceeds the triggering level of the first input triggering circuit as shown at A in FIG. 1. If the amplitude of the leading edge of the input pulse exceeds the triggering voltage of the input triggering circuit, a change of state of the trigger takes place which results in the formation of a leading edge of an input triggering circuit output pulse as disclosed at B in FIG. 2. This state is maintained until the trailing edge of the input pulse falls below the trigger level to cause the trigger to revert back to its original state. The result is the uniform rectangular pulse disclosed at B in FIG. 2. This pulse passes through the isolation stage and is applied across threshold capacitor 25 as shown at C in FIG. 2. This pulse at point C will commence charging trigger control capacitor 28 through resistor 27. Capacitor 28 is large enough so that it will continue charging for the duration of the input pulse. Since capacitor 25 charges up almost immediately and since capacitor 28 is slow to charge, the voltage across capacitor 25 during the charging period will be more negative than the voltage across capacitor 28 and the diode 29 will remain back-biased. The voltage waveform developed across the trigger control capacitor 28 is shown at D in FIGURE 2 and its leading edge possesses a generally linear wave shape. When the negative-going voltage at D rises above the triggering level of the output trigger circuit as represented by the horizontal dotted line 59 at D in FIGURE 2, the Schmidt trigger circuit including transistors 34 and 39 will change its state to produce an output pulse having a lower voltage level and which is rectangular in form, as shown at E in FIGURE 2. The output trigger circuit will remain in this second state until the voltage developed at point D again falls below the triggering level at which time the trigger will revert back to its former state. At a time T3 represented by the vertical line so labeled in FIGURE 2, the rectangular pulse across the capacitor 25 will begin to decay as shown at C in FIGURE 2. This point represents the cessation of the input signal across terminals 6 and 6'. At this time, the threshold capacitor 25 will commence to discharge through resistor 24 which is connected in parallel with it. Trigger control capacitor 28 will also commence to discharge through series resistor 27 and resistor 24. Series resistor 27, however, is preferably larger than resistor 24 and since trigger control capacitor 28 must discharge through both of these resistors, the rate of decay of the voltage across this capacitor will be much less than the decay rate of the voltage across threshold capacitor 25. At a time T4 represented by the vertical line shown in FIGURE 2, the voltage at the ungrounded terminal of threshold capacitor 25 will become more positive than the voltage at the ungrounded terminal of trigger control capacitor 28 and the diode will become unblocked. This action will allow trigger control capacitor 28 to discharge through diode 29 and resistor 24 at a far more rapid rate than when it was previously discharging through resistors 24 and 27. Shortly after the unblocking of diode 29, the triggering voltage will fall below the triggering level and the output trigger will revert to its original state as previously described. This unblocking action results in an extremely rapid recovery time so that the circuit of FIGURE 1 may delay pulses which are applied across input terminals 6 and 6' at a high frequency.

The leading edge time delay interval T1 as shown in FIGURE 2 is directly proportional to the charging rate of trigger control capacitor 28, and thus the leading edge delay time for the output pulse T1 may be controlled by merely varying the value of resistor 27. The trailing edge delay time T2 for the output pulse as shown in FIGURE 2 may be controlled by varying the value of resistor 24. Changing the value of resistor 24 would have no effect upon the charging rate of capacitor 28 but would affect the discharge rate of capacitor 25. Hence, if the value of resistor 24 should be decreased, capacitor 25 would discharge through it at a more rapid rate, causing the diode to become unblocked in earlier time in the cycle than previously. This means capacitor 28 would discharge through the diode and resistor 24 at an earlier time in the cycle and thus the threshold triggering level at point E in the circuit would be reached more rapidly than before, and hence the trailing edge of the output pulse at point E would be delayed a lesser time period than before.

The isolation stage comprising transistor 18 and resistor 22 is utilized to prevent the variable input impedance of the control circuit from affecting the output voltage of the input trigger circuit which comprise transistors 8 and 14. This variation of control circuit input impedance is caused by the change of state of diode 23 from the blocked to the unblocked condition and vice versa. The voltage level of the pulse at point B must remain constant so that the charging rate of capacitor 28 remains constant. Without the isolation stage comprising transistor 18 and resistor 22, timing circuit input impedance variations might cause the afore-mentioned voltage level to fluctuate. Also, resistor 17 has a high resistance compared to resistor 22 and if the isolation stage comprising transistor 18 and resistor 22 were absent, a longer time would be required to charge capacitor 28 and the frequency response of the circuit would be reduced. In the test circuit resistor 17 was 5,000 ohms and resistor 22 was 300 ohms.

The regulated voltage source comprising the unregulated D.C. voltage source 1, resistor 2, and Zener diode 4, connected in series with one another, functions to keep the amplitude of the voltage pulses produced at B, C and D in FIGURE 2 constant regardless of possible fluctuations in the output voltage of the unregulated D.C. voltage source 1. This regulation is necessary if the delay time of the input pulse is to be independent of the afore-mentioned fluctuations.

The isolation stage comprising transistor 30 and resistor 31 is also of considerable importance in the circuit. The input impedance of output trigger circuit is quite low and fluctuates sharply with temperature. If the isolation emitter stage were absent and the base of transistor 34 was connected directly to point D of FIGURE 1, the charging rate of trigger control capacitor 28 and hence the delay time T1 would vary with temperature because the low input impedance of transistor 34 would tend to discharge capacitor 28 through the emitter base circuit of 34 at varying rates depending upon temperature while this capacitor is charging. Thus, the isolation emitter stage is essential in producing a fixed rate of charging of capacitor 28 and hence a fixed delay interval T1 for various temperatures.

It should be understood that in order for a single pulse applied to the input terminals 6 and 6′ to produce an output signal at output terminals 45 and 46, it must have a minimum pulse width for a given set of circuit parameters, besides having a sufficient amplitude to trigger the input trigger circuit. If this pulse is less than the minimum pulse width, the trigger control capacitor 28 will not have enough time to develop a sufficient voltage to trigger the output trigger circuit and no output pulse will result. However, if a train of such pulses having less than the minimum pulse width is produced at the input terminals 6 and 6′, an output pulse will be produced at terminals 45 and 46 having a pulse width equal to the width of the afore-mentioned train. This results from the integration effect of threshold capacitor 25 which will produce a waveform disclosed at C in FIGURE 2 similar to the waveform produced in response to a single pulse. In order to produce an output pulse across terminals 45 and 46, the afore-mentioned train must have a minimum frequency which is a function of the value of resistor 24. If the frequency of the train is less than the minimum value, threshold capacitor 25 will not be able to charge up since resistor 24 connected in shunt with it continually tends to discharge the capacitor. Under these circumstances, trigger control capacitor 28 will be unable to charge up and hence the second trigger circuit will remain in its original state and no output pulse will be produced.

In the event that the entire circuit to the left of resistor 24 shown in FIGURE 1 were eliminated, excluding the source of regulated voltage, the remaining circuit would still function to delay and shape an input pulse applied across resistor 24 at point C. The delay intervals would now be a function of the shape of the input pulse in addition to the circuit parameters. For instance, the leading edge of a rectangular input pulse would be delayed by an amount of time proportional to the amplitude of said pulse, although a non-rectangular pulse would also be delayed and shaped by the circuit.

Various other modifications will occur to those skilled in the art within the spirit of the invention and the scope of the appended claims.

What is claimed is:

1. A time delay circuit comprising, a control circuit having input and output terminals, a first resistance element and a first reactance element both connected across said pair of input terminals, a second reactance element connected across said pair of output terminals, a second resistance element connected between one of said input terminals and one of said output terminals, means for connecting the other of said input terminals and the other of said output terminals together, and a non-linear impedance device connected in parallel with said second resistance element, means for coupling the input pulse to be delayed to the input terminals of said control circuit, a trigger circuit having input and output terminals for producing across its output terminals an output pulse whose leading edge is initiated when the amplitude of an input pulse applied thereto rises above a predetermined value and whose trailing edge is initiated when the amplitude of an input pulse applied thereto falls below a predetermined value, and coupling means for applying the control pulse in the output terminals of said control circuit as an input pulse to the input terminal of said trigger circuit.

2. The combination as set forth in claim 1 wherein said reactance elements comprise capacitors.

3. The combination as set forth in claim 1 wherein said means for coupling the input pulse to be delayed to the input terminals of said control circuit comprises a trigger circuit.

References Cited in the file of this patent

UNITED STATES PATENTS

| | | |
|---|---|---|
| 2,471,138 | Bartelink | May 24, 1949 |
| 2,514,285 | Moore | July 4, 1950 |
| 2,653,237 | Johnstone | Sept. 22, 1953 |
| 2,698,416 | Sherr | Dec. 28, 1954 |